(12) United States Patent
Wei et al.

(10) Patent No.: US 11,215,540 B2
(45) Date of Patent: *Jan. 4, 2022

(54) LOADING PLATFORM FOR ROCK MECHANICS TEST

(71) Applicants: Chengdu University of Technology, Chengdu (CN); Sichuan University, Chengdu (CN)

(72) Inventors: Yufeng Wei, Chengdu (CN); Jianfeng Liu, Chengdu (CN); Lu Wang, Chengdu (CN); Huining Xu, Chengdu (CN); Xiaozhang Lei, Chengdu (CN); Jianhui Deng, Chengdu (CN); Dongjie Xue, Chengdu (CN); Chunping Wang, Chengdu (CN); Jianliang Pei, Chengdu (CN); Wenxi Fu, Chengdu (CN); Da Zheng, Chengdu (CN)

(73) Assignees: CHENGDU UNIVERISITY OF TECHNOLOGY, Chengdu (CN); SICHUAN UNIVERSITY, Chengdu (CN)

( * ) Notice: Subject to any disclaimer, the term of this patent is extended or adjusted under 35 U.S.C. 154(b) by 122 days.

This patent is subject to a terminal disclaimer.

(21) Appl. No.: 16/396,790

(22) Filed: Apr. 29, 2019

(65) Prior Publication Data
US 2019/0331567 A1 Oct. 31, 2019

(30) Foreign Application Priority Data
Apr. 28, 2018 (CN) .......................... 201810403204.8

(51) Int. Cl.
*G01N 3/02* (2006.01)

(52) U.S. Cl.
CPC ....... *G01N 3/02* (2013.01); *G01N 2203/0256* (2013.01)

(58) Field of Classification Search
CPC .... G01N 3/02; G01N 3/12; G01N 2203/0048; G01N 2203/0226; G01N 2203/0232; G01N 2203/0256; G05B 9/02
See application file for complete search history.

(56) References Cited

FOREIGN PATENT DOCUMENTS

| CN | 106018059 A | * 10/2016 |
|---|---|---|
| CN | 106248487 A | * 12/2016 |

(Continued)

OTHER PUBLICATIONS

CN-107014672-A-English (Year: 2017).*

(Continued)

*Primary Examiner* — Herbert K Roberts
*Assistant Examiner* — Fatemeh Esfandiari Nia
(74) *Attorney, Agent, or Firm* — Bayramoglu Law Offices LLC

(57) ABSTRACT

A loading platform for a rock mechanics test system (MTS) to realize simple and reliable connection between a high temperature and high pressure force sensor in a triaxial chamber cavity and an upper solid rigid column. The loading platform for rock mechanics test includes a master rod, a secondary rod and a stop sleeve sleeved on the master rod; the stop sleeve is provided with two corbel structures; the secondary rod is composed of a secondary rod head body and a secondary rod body; a circular magnetic block is fixed on the secondary rod to adsorb a hole alignment sleeve sleeved on the secondary rod; and the hole alignment sleeve marked with a first scale line and a second scale line.

6 Claims, 6 Drawing Sheets

(56) References Cited

FOREIGN PATENT DOCUMENTS

| CN | 106989986 | A | * | 7/2017 | | |
|---|---|---|---|---|---|---|
| CN | 107014672 | A | * | 8/2017 | | |
| CN | 107063882 | A | * | 8/2017 | ............... | G01N 3/18 |

OTHER PUBLICATIONS

CN107063882A—preview (Year: 2017).*
CN106248487A—preview (Year: 2016).*
CN106018059A—pre (Year: 2016).*
CN106989986A—PRE (Year: 2017).*

* cited by examiner

LOADING PLATFORM FOR ROCK MECHANICS TEST

CROSS REFERENCE TO THE RELATED APPLICATIONS

This application is based upon and claims priority to Chinese Patent Application No. 201810403204.8, filed on Apr. 28, 2018, the entire contents of which are incorporated herein by reference.

TECHNICAL FIELD

This invention belongs to the field of experimental equipment for testing damage mechanical behaviors of engineering rock masses, in particular relates to a loading platform for a rock mechanics test system (MTS).

BACKGROUND

At present, MTS815 rock mechanics test system produced by MTS Systems Corporation of the United States is one of the most advanced rock mechanics equipment and the most popular rock mechanics test systems in the world. The MTS815 rock mechanics test system has excellent performance. However, in practical use, high temperature and high pressure force sensors working as core members of the test systems are inevitably damaged. Therefore, the force sensors are required to be checked, maintained, replaced and mounted when necessary. It is not easy to accurately mount a high temperature and high pressure force sensor having complex structure into a narrow cavity of a high temperature and high pressure chamber. Considering the narrow cavity of the high temperature and high pressure chamber, on the one hand, it is difficult to observe the mounting state and make adjustment accordingly; and on the other hand, manual mounting operation is limited due to the narrow space for mounting; and additionally, to connect the force sensor with a upper rigid column, central threaded holes and small limiting holes thereof should be accurately aligned at the same time. Thus, it is extremely difficult to rapidly and accurately mount the force sensor in place, in particular for mounting of the high temperature and high pressure force sensor under manual lifting with poor force and sustainability. Therefore, the mounting with manual lifting requires a long time for mounting and has low efficiency. The possibility of accidents increases with the extended mounting time, e.g., dropping of the sensor, and risks of physical damages and secondary damages to the sensor also increase. In conclusion, it is necessary to shorten the connection process of the force sensor and improve the mounting efficiency. However, there is no available equipment for connecting the high temperature and high pressure force sensor of the MTS test system.

SUMMARY

In view of the situation that there is no available connection equipment for mounting the MTS triaxial force sensor, the invention provides a loading platform for rock mechanics test. The platform can make a limiting hole align with a limiting hole of an upper structure, so as to solve the problem of aligning the limiting hole of the triaxial force sensor in the triaxial chamber during the mounting process, and fill the blank of the connection equipment for the triaxial force sensors of MTS Systems Corporation of the United States. The invention is significant for improving the mounting efficiency of the force sensor in the triaxial chamber, securing the equipment and preventing personal injuries.

The technical solution of the invention is a loading platform for rock mechanics test, comprising a master rod 2 for aligning with a central threaded hole 21 and a secondary rod 14 for aligning with a peripheral limiting hole 22; the master rod 2 and the secondary rod 14 are kept in a horizontal level, with a center-to-center distance therebetween equal to a center-to-center distance between the central threaded hole 21 and the peripheral limiting hole 22;

The loading platform for rock mechanics test is characterized in that a stop sleeve 3 is sleeved on the master rod 2 to keep the master rod 2 and the secondary rod 14 in a horizontal level and the center-to-center distance between the master rod 2 and the secondary rod 14 equal to the center-to-center distance between the central threaded hole 21 and the peripheral limiting hole 22; the stop sleeve 3 is cylindrical and provided with two corbel structures, i.e., an upper corbel 15 and a lower corbel 16; an end round hole axis of the upper corbel 15 coincides with an end round hole axis of the lower corbel 16; the end round hole axis of the upper corbel 15 and the end round hole axis of the lower corbel 16 are parallel to the axis of the master rod 2; a circular magnetic block 6 is fixed on a secondary rod body 20, the circular magnetic block 6 is configured to adsorb a hole alignment sleeve 5 sleeved on the secondary rod body 20; an inner diameter of the hole alignment sleeve 5 equals an inner diameter of a steel pin in a limiting hole 24 arranged on the sensor 23; the hole alignment sleeve 5 is marked with a first scale line and a second scale line; the first scale line corresponds to a relaxed or aligned state, and the second scale line corresponds to a contracted or aligning state; and the secondary rod 14 is composed of a secondary rod head body 9 and the secondary rod body 20, and the secondary rod head body 9 is connected with the secondary rod body 20 by means of a spring 8.

Further, the secondary rod body 20 and the upper corbel 15 are fixed by means of a horizontal cylindrical pin 7.

Further, the master rod 2 is composed of a threaded rod 17, a smooth cylinder 18 and a smooth cylinder 19 with a horizontal hole; and the threaded rod 17 is capable of rotating into a threaded hole at a lower end of a solid rigid column 13 in a triaxial chamber of a test system, the smooth cylinder is arranged in the middle of the master rod 2, and the stop sleeve 3 is sleeved on the smooth cylinder 18.

Further, the master rod 2 is provided with a horizontal cylindrical short rod 1, the horizontal cylindrical short rod 1 runs through a round hole arranged on the smooth cylinder 19 with the horizontal hole of the master rod 2; and after the horizontal cylindrical short rod 1 is inserted into the round hole on the smooth cylinder 19 with the horizontal hole, the master rod 2 is capable of being rotated to rotate the threaded rod 17 into the threaded hole 21 at the lower end of the solid rigid column 13 in the triaxial chamber of the test system.

Further, the secondary rod body 20 of the secondary rod 14 is a cylindrical rod; a rolling steel ball 10 is arranged on the secondary rod head body 9 at an upper part of the secondary rod 14; and an outer diameter of the secondary rod head body 9 is smaller than an inner diameter of the peripheral limiting hole.

Further, the spring 8 is a cylindrical compression spring.

The beneficial effects of the invention are as follows:

Rapid and simple hole alignment process. After the threaded rod section of the master rod is inserted into the central threaded hole of the solid rigid column, the stop sleeve is rotated for no more than one circle to align with the limiting hole accurately.

Simple method for judging the alignment. The secondary rod head is capable of rolling into the limiting hole. The successful insertion of the head makes a special sound, and the scale mark corresponding to the lower end of the secondary rod changes. That is, when a special sound is heard and the lower end of the secondary rod corresponds to the upper scale line, the hole alignment succeeds.

Simple and reliable hole alignment between the sensor and the solid rigid column. After insertion of the secondary rod, the hole alignment sleeve is lowered down; and after the lower section of the master rod is inserted into the center hole of the force sensor, the force sensor is rotated to sleeve the hole alignment sleeve on the stop pin of the force sensor, so as to align the center hole of the force sensor with the limiting hole of the solid rigid column.

Marks in the figures: 1—horizontal cylindrical short rod, 2—master rod, 3—stop sleeve, 4—lower end of secondary rod body, 5—hole alignment sleeve, 6—circular magnetic block, 7—horizontal cylindrical pin, 8—spring, 9—secondary rod head body, 10—rolling steel ball, 11—upper scale line, 12—lower scale line, 13—solid rigid column, 14—secondary rod, 15—upper corbel, 16—lower corbel, 17—threaded rod, 18—smooth cylinder, 19—smooth cylinder with a horizontal hole, 20—secondary rod body, 21—central threaded hole, 22—peripheral limiting hole, 23—sensor, 24—limiting hole (location of steel pin), 25—horizontal hole.

DETAILED DESCRIPTION OF THE EMBODIMENTS

Figure 1:
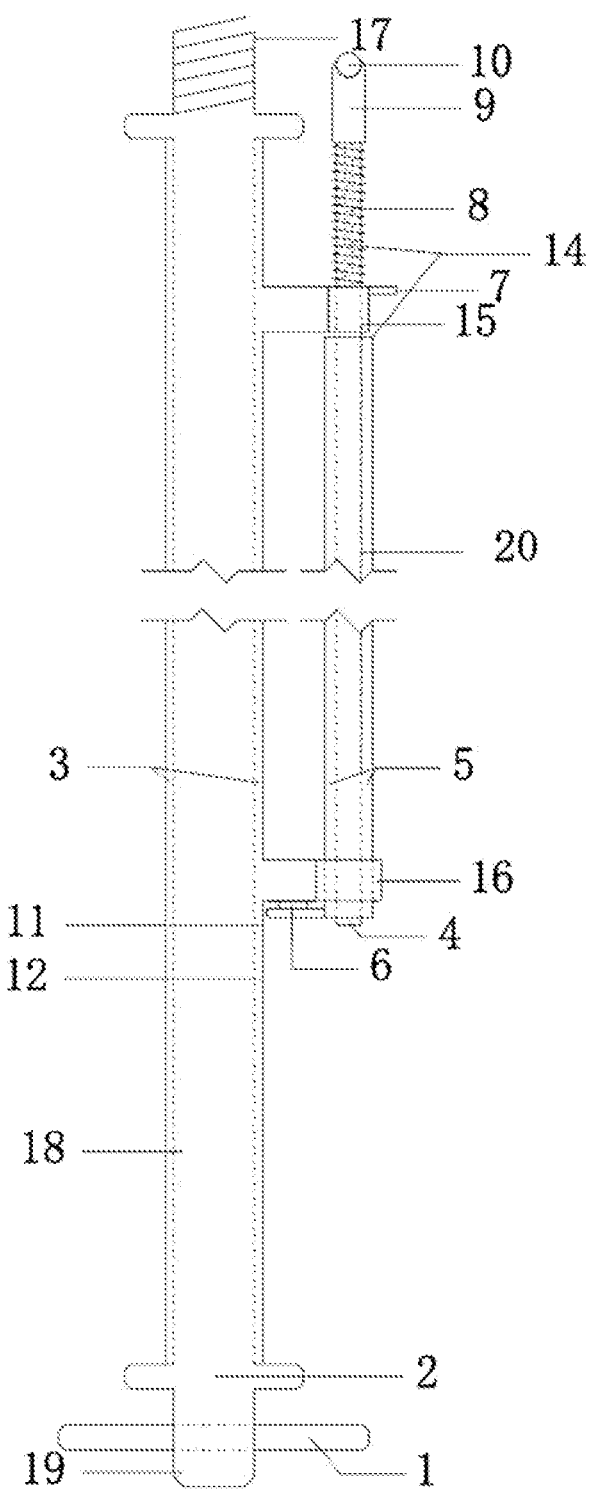
FIG. 1 is a structural diagram of a loading platform for rock mechanics test.

The invention will be further described in combination with drawings and embodiments:

As shown in FIG. 1, a loading platform for rock mechanics test comprises a master rod 2, a secondary rod 14, a stop sleeve 3, a hole alignment sleeve 5 and related accessory members.

The master rod 2 is configured to align with a central threaded hole 21, and the secondary rod 14 is configured to align with a limiting hole. The cylindrical stop sleeve 3 is sleeved on the master rod 2 to keep the master rod 2 and the secondary rod 14 in a horizontal level and a center-to-center distance therebetween equal to a center-to-center distance between the central threaded hole 21 and the peripheral limiting hole 22. The rigid connection between the master rod 2 and the secondary rod 14 ensures that the master rod 2 and the secondary rod 14 are kept in a horizontal level and the center-to-center distance therebetween equals the center-to-center distance between the central threaded hole 21 and the peripheral limiting hole 22. Both the central threaded hole 21 and the peripheral limiting hole 22 are arranged on the MTS test system, the stop sleeve 3 is provided with two corbel structures, i.e., an upper corbel 15 and a lower corbel 16; an end round hole axis of the upper corbel 15 coincides with an end round hole axis of the lower corbel 16; and the end round hole axis of the upper corbel 15 and the end round hole axis of the lower corbel 16 are parallel to the axis of the master rod 2.

A circular magnetic block 6 is fixed on the secondary rod 14, the circular magnetic block 6 is configured to adsorb a hole alignment sleeve 5 sleeved on the secondary rod 14; an inner diameter of the hole alignment sleeve 5 equals an inner diameter of a steel pin in a limiting hole 24 arranged on the sensor 23; the hole alignment sleeve 5 are marked with a first scale line and a second scale line; and the first scale line corresponds to a relaxed or an aligned state, and the second scale line corresponds to a contracted or an aligning state.

The master rod 2 is composed of a threaded rod 17, a smooth cylinder 18 and a smooth cylinder 19 with a horizontal hole, the threaded rod 17 is capable of rotating into a threaded hole at a lower end of a solid rigid column 13 in a triaxial chamber of the test system, the smooth cylinder is arranged in the middle of the master rod 2, and the stop sleeve 3 is sleeved on the smooth cylinder 18.

The master rod 2 is provided with a horizontal cylindrical short rod 1, and the horizontal cylindrical short rod 1 runs through a round hole arranged on the smooth cylinder 19 with the horizontal hole of the master rod 2; and after the horizontal cylindrical short rod 1 is inserted into the round hole on the smooth cylinder 19 with the horizontal hole, the master rod 2 is capable of being rotated to rotate the threaded rod 17 into the threaded hole 21 at the lower end of the solid rigid column 13 in the triaxial chamber of the test system.

The secondary rod 14 is composed of a secondary rod head body 9 and a secondary rod body 20; the secondary rod body 20 is a cylindrical rod; the secondary rod head body 9 is connected with the secondary rod body 20 by means of a spring 8; the secondary rod head body 9 arranged at an upper part of the secondary rod 14 is provided with a rolling steel ball 10; an outer diameter of the secondary rod head body 9 is lower than the inner diameter of the peripheral limiting hole 22; the secondary rod head body 9 is capable of inserting into the peripheral limiting hole 22; the secondary rod body 20 is fixed on the upper corbel 15 by means of a horizontal cylindrical pin 7; the body of the secondary rod 14 is a cylindrical rod; the secondary rod head body 9 arranged at the upper part of the secondary rod 14 is provided with a rolling steel ball 10; an outer diameter of the secondary rod head body 9 is lower than the inner diameter of the peripheral limiting hole 22; and the secondary rod head body 9 is capable of inserting into the peripheral limiting hole 22.

Figure 2:
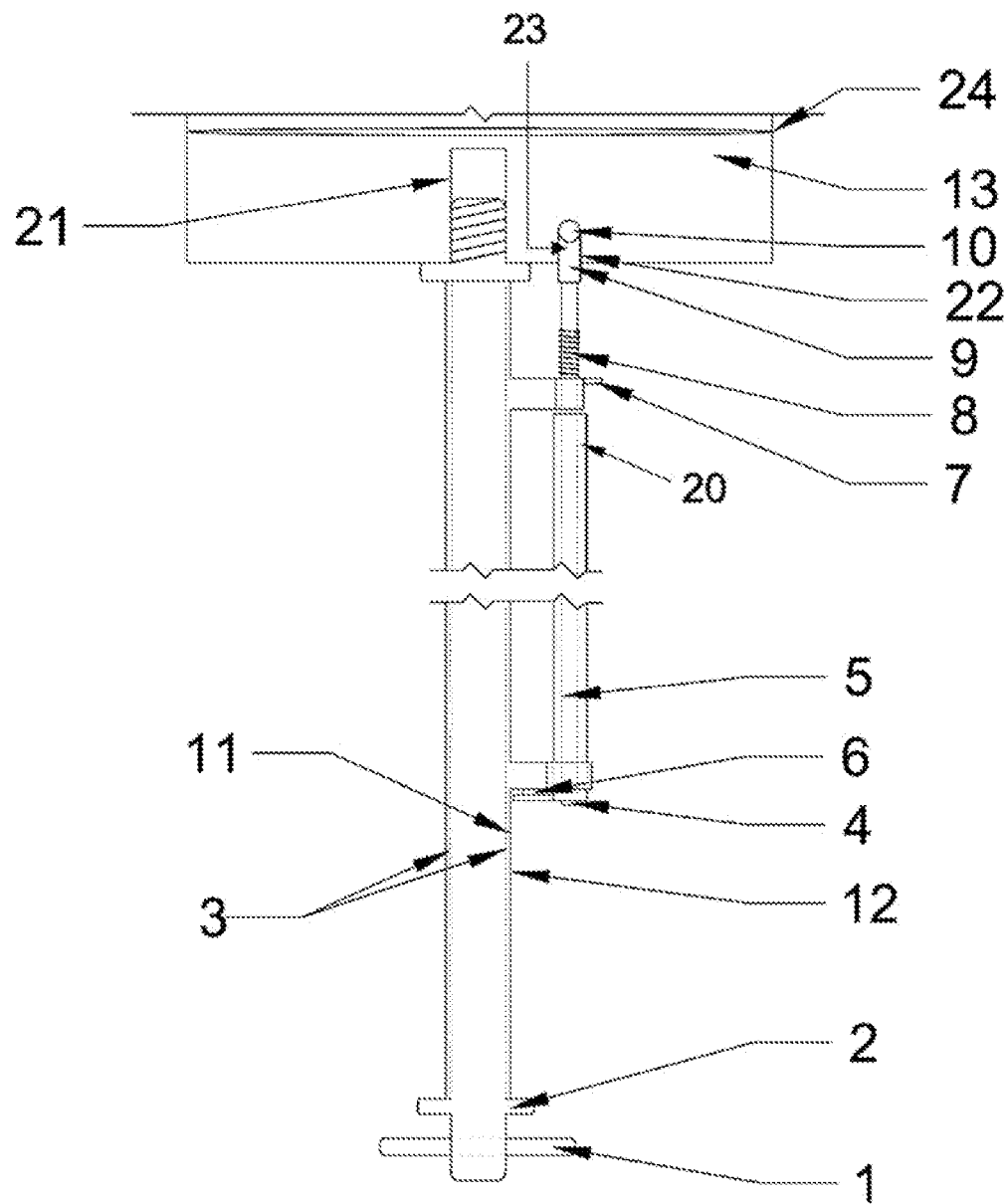
FIG. 2 shows a relaxed or aligned state of an accurate limiting hole alignment device.

FIG. 2 shows a relaxed or the aligned state of an accurate limiting hole alignment device. The lower end of the secondary rod body 4 is pointed at the upper scale line 11, the term "relaxed" means that the secondary rod 14 is retractable freely and the term "aligned" means that the secondary rod body 9 is inserted into the peripheral limiting hole 22 at a lower end of the solid rigid column 13. At the relaxed state, the spring 8 is free and the length thereof is equal to original length thereof; and at the aligned state, the spring 8 is subject to deformation but is not locked in position, thus the length thereof is smaller than the original length thereof.

Figure 3:
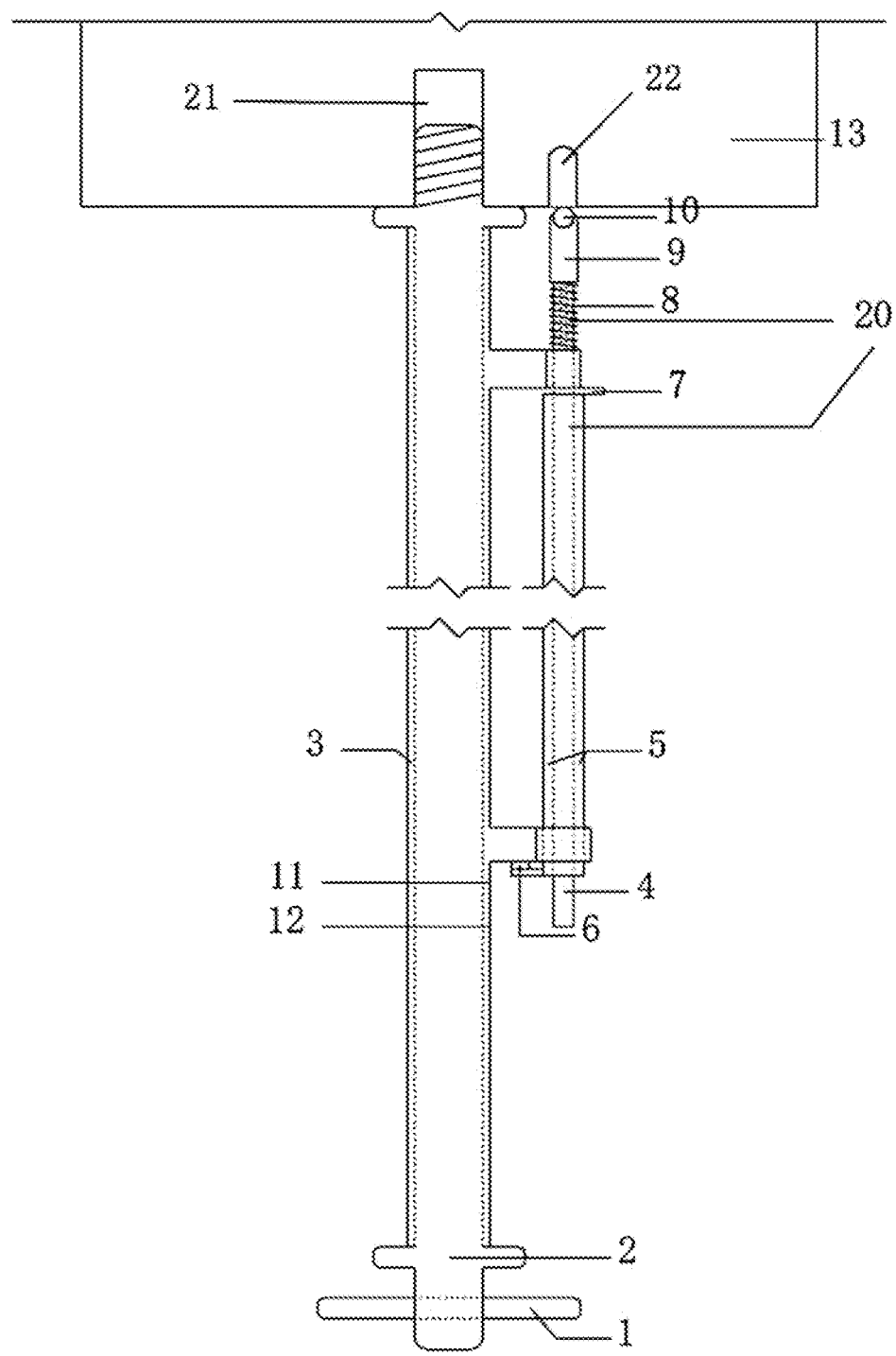
FIG. 3 shows a contracted or aligning state of the accurate limiting hole alignment device.

FIG. 3 shows a contracted or the aligning state of the accurate limiting hole alignment device. The secondary rod body 4 is pointed at the lower scale line 12, the term "contracted" means that the secondary rod is retracted to withdraw the rod head from the peripheral limiting hole 22 at the lower end of the solid rigid column 13 after alignment; and the term "aligning" means that the secondary rod aligns with the peripheral limiting hole 22 during rotation of the sleeve after the threaded rod section of the master rod is inserted into the central threaded hole 21 at the lower end of the solid rigid column 13. At the contracted state, the spring 8 is subject to elastic deformation that shortens the length thereof, thus the length of the spring 8 is smaller than the original length thereof at this time, and the spring is capable of being pushed out of the peripheral limiting hole 22; at the aligning state, the spring 8 is locked in position and is subject to the maximum elastic deformation, thus the length of the spring 8 is smaller than the original length thereof; and the maximum deformation maintained in the aligning process of the spring 8 is conducive to reducing torsional deformation of the spring 8, decreasing displacement of the secondary rod head body 9 in the aligning process and improving aligning accuracy.

Figures 4, 5:
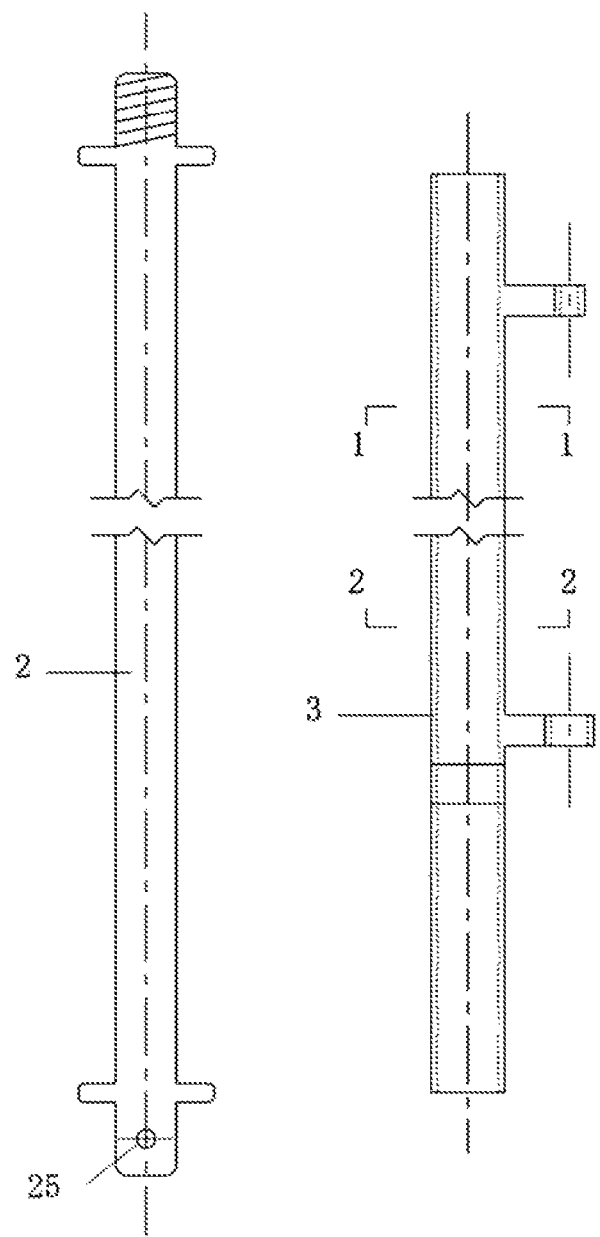
FIG. 4 is a side view of a master rod.
FIG. 5 is a front view of a stop sleeve.

As shown in FIG. 4, the master rod 2 is provided with the horizontal cylindrical short rod 1, and the horizontal cylindrical short rod 1 runs through a round hole arranged on the smooth cylinder 19 with the horizontal hole of the master rod 2; after the horizontal cylindrical short rod 1 is inserted into the round hole on the smooth cylinder 19 with the horizontal hole, the master rod 2 is capable of being rotated to rotate the threaded rod 17 into the threaded hole at the lower end of the solid rigid column 13 in the triaxial chamber of the test system; and the horizontal cylindrical short rod 1 provides a point of external force application when the threaded rod 17 of the master rod 2 is rotated into the threaded hole.

As shown in FIG. 5, the stop sleeve 3 is cylindrical and provided with two corbel structures, i.e., an upper corbel 15 and a lower corbel 16; the end round hole axis of the upper corbel 15 coincides with the end round hole axis of the lower corbel 16; and the end round hole axis of the upper corbel 15 and the end round hole axis of the lower corbel 16 are parallel to the axis of the master rod 2.

Figure 6:
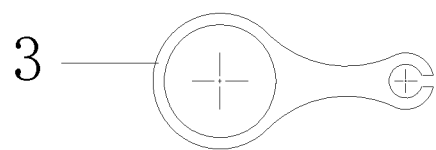
FIG. 6 is a 1-1 sectional view of a stop sleeve.
Figure 7:
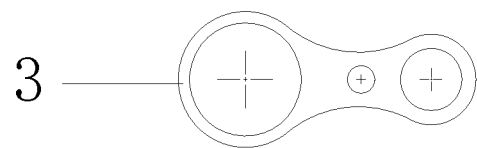
FIG. 7 is a 2-2 sectional view of the stop sleeve.

As shown in FIG. 6 and FIG. 7, the master rod 2 and the secondary rod 14 are kept in a horizontal level, with the center-to-center distance therebetween equal to the center-to-center distance between the central threaded hole 21 and the peripheral limiting hole 22; the end round hole axis of the upper corbel 15 coincides with the end round hole axis of the lower corbel 16; and the end round hole axes of the upper corbel 15 and the lower corbel 16 are parallel to the axis of the master rod 2.

Figure 8:
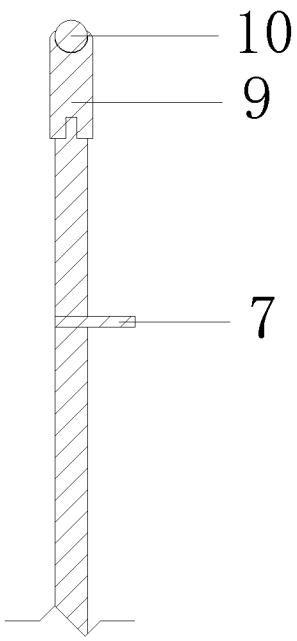
FIG. 8 is a vertical section of a secondary rod.
Figure 8:
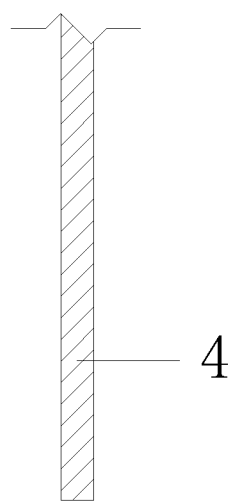
Figure 9:
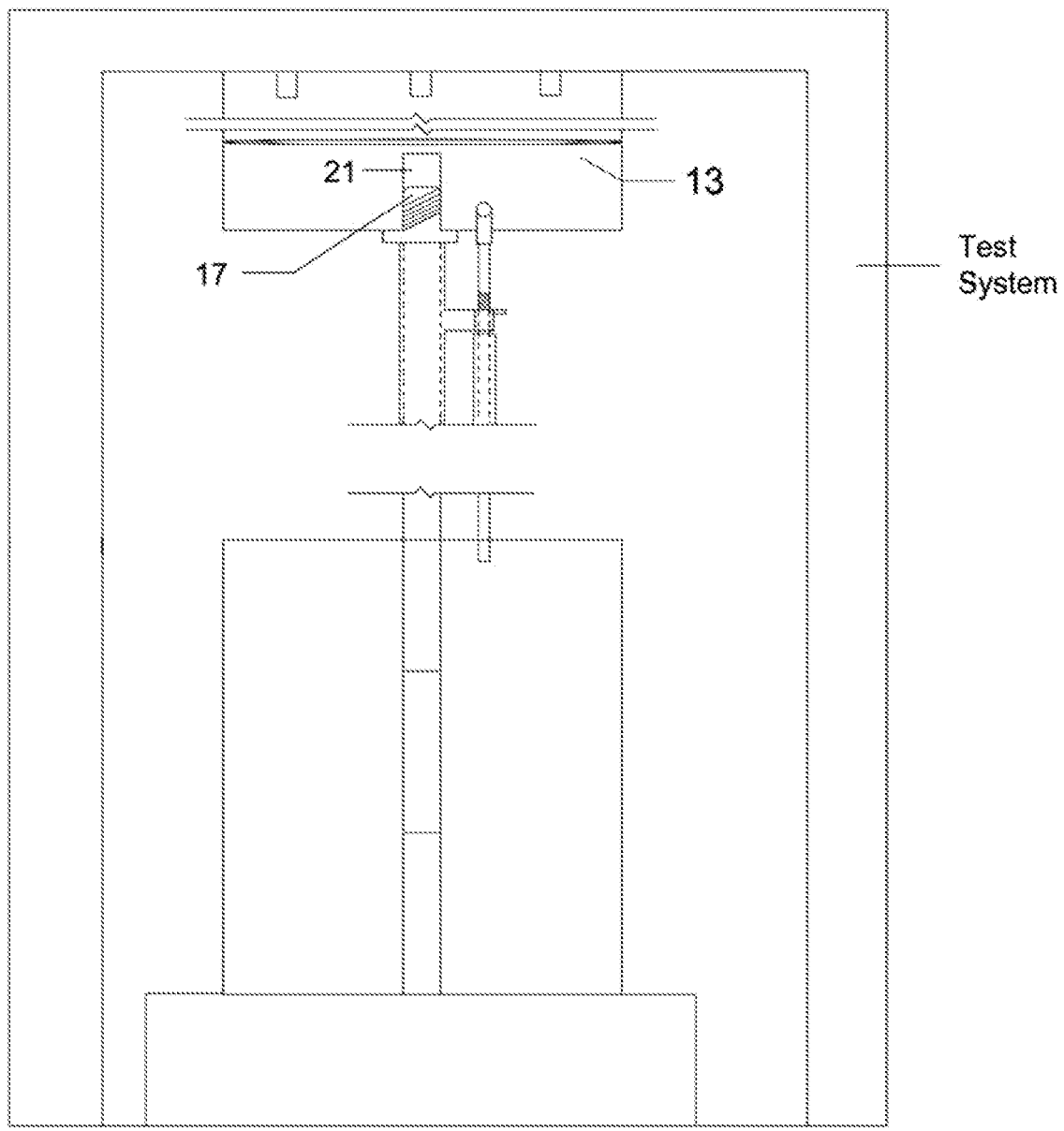
FIG. 9 shows the loading platform with the threaded rod 17 rotated into a central threaded hole 21 at a lower end of a solid rigid column 13 in a triaxial chamber of the MTS rock mechanics test system.

As shown in FIG. 8, the secondary rod 14 is composed of the secondary rod head body 9 and the secondary rod body 20; the secondary rod head body 9 is provided with the rolling steel ball 10; the outer diameter of the secondary rod head body 9 is lower than the inner diameter of the peripheral limiting hole 22; and the horizontal cylindrical pin 7 is arranged on the secondary rod body 20.

What is claimed is:

1. A loading platform for rock mechanics test, comprising: a master rod for aligning with a central threaded hole and a secondary rod for aligning with a peripheral limiting hole;
    a first center-to-center distance between the master rod and the secondary rod equal to a second center-to-center distance between the central threaded hole and the peripheral limiting hole; and
    a stop sleeve is sleeved on the master rod to keep the master rod and the secondary rod in a horizontal level and a first center-to-center distance between the master rod and the secondary rod is equal to a second center-to-center distance between the central threaded hole and the peripheral limiting hole;
    wherein the stop sleeve is cylindrical and provided with two corbel structures including an upper corbel and a lower corbel;
    an end round hole axis of the upper corbel coincides with an end round hole axis of the lower corbel;
    the end round hole axis of the upper corbel and the end round hole axis of the lower corbel are parallel to an axis of the master rod;
    a circular magnetic block is fixed on a secondary rod body, the circular magnetic block is configured to stick to a hole alignment sleeve sleeved on the secondary rod body;
    an inner diameter of the hole alignment sleeve equals an inner diameter of a steel pin in a limiting hole arranged on a sensor;
    the hole alignment sleeve aligns a bottom of the secondary rod body at a first scale line and a second scale line;
    the first scale line corresponds to a relaxed or aligned state, and the second scale line corresponds to a contracted or aligning state; and
    the secondary rod is composed of a secondary rod head body and the secondary rod body, wherein a spring is sleeved on a part of the secondary rod body connecting to the secondary rod head body, and the secondary rod body moves inside the spring.

2. The loading platform for rock mechanics test of claim 1, wherein, the secondary rod body and the upper corbel are fixed by means of a horizontal cylindrical pin.

3. The loading platform for rock mechanics test of claim 1, wherein, the master rod is composed of a threaded rod, a smooth cylinder and a smooth cylinder with a horizontal hole; the threaded rod is configured to rotate into the central threaded hole at a lower end of a solid rigid column in a triaxial chamber of a test system, the smooth cylinder is arranged in a middle of the master rod, and the stop sleeve is sleeved on the smooth cylinder.

4. The loading platform for rock mechanics test of claim 3, wherein, the master rod is provided with a horizontal cylindrical short rod, the horizontal cylindrical short rod runs through a round hole arranged on the smooth cylinder with the horizontal hole of the master rod; and after the horizontal cylindrical short rod is inserted into the round hole on the smooth cylinder with the horizontal hole, the master rod is configured to rotate the threaded rod into the central threaded hole at a lower end of a solid rigid column in a triaxial chamber of a test system.

5. The loading platform for rock mechanics test of claim 1, wherein, the secondary rod body of the secondary rod is a cylindrical rod; a rolling steel ball is arranged on the secondary rod head body at an upper part of the secondary rod; and an outer diameter of the secondary rod head body is smaller than an inner diameter of the peripheral limiting hole.

6. The loading platform for rock mechanics test of claim 1, wherein, the spring is a cylindrical compression spring.

\* \* \* \* \*